United States Patent
Lin et al.

(10) Patent No.: US 11,372,218 B2
(45) Date of Patent: Jun. 28, 2022

(54) IMAGING LENS AND MANUFACTURING METHOD OF LIGHT-SHIELDING ELEMENT

(71) Applicant: Rays Optics Inc., Hsinchu County (TW)

(72) Inventors: Meng-Wei Lin, Hsinchu County (TW); Chen-Cheng Lee, Hsinchu County (TW)

(73) Assignee: Rays Optics Inc., Hsinchu County (TW)

( * ) Notice: Subject to any disclaimer, the term of this patent is extended or adjusted under 35 U.S.C. 154(b) by 220 days.

(21) Appl. No.: 16/687,590

(22) Filed: Nov. 18, 2019

(65) Prior Publication Data
US 2021/0072519 A1    Mar. 11, 2021

(30) Foreign Application Priority Data
Sep. 10, 2019   (TW) .................................. 108132590

(51) Int. Cl.
*G02B 5/20*    (2006.01)
*G02B 13/14*   (2006.01)
*G02B 13/00*   (2006.01)

(52) U.S. Cl.
CPC ............ *G02B 13/146* (2013.01); *G02B 5/20* (2013.01); *G02B 5/208* (2013.01); *G02B 13/0015* (2013.01)

(58) Field of Classification Search
CPC .......... G02B 5/00; G02B 5/003; G02B 5/005; G02B 5/20; G02B 5/208; G02B 5/22; G02B 5/28; G02B 5/281; G02B 13/0015; G02B 13/146; G02B 27/0018

USPC ................ 359/350–361, 601, 614, 588–590, 359/885–892
See application file for complete search history.

(56) References Cited

U.S. PATENT DOCUMENTS

| | | | |
|---|---|---|---|
| 7,880,979 B2* | 2/2011 | Chang | G02B 5/005 359/738 |
| 8,102,609 B2* | 1/2012 | Tsuchiya | G02B 7/025 359/819 |
| 9,175,831 B2* | 11/2015 | Yamano | F21V 9/08 |
| 10,051,208 B2* | 8/2018 | Dainty | G02B 5/005 |
| 2011/0002053 A1* | 1/2011 | Ovrutsky | G02B 3/0031 359/738 |

(Continued)

FOREIGN PATENT DOCUMENTS

WO   2011007435   1/2011

*Primary Examiner* — Thong Q Nguyen
(74) *Attorney, Agent, or Firm* — JCIPRNET

(57) ABSTRACT

An imaging lens including an aperture and a lens with refractive power arranged from a zoom-in side to a zoom-out side along an optical axis is provided. The aperture includes a substrate and a light-shielding layer. The substrate includes a first middle region and a first outer edge region surrounding the first middle region. The first outer edge region allows visible light and infrared light to substantially pass therethrough. The light-shielding layer includes a second middle region and a second outer edge region surrounding the second middle region. The second outer edge region allows infrared light to substantially pass therethrough and substantially shields visible light. A thickness of the aperture is between 0.01 mm and 0.3 mm along a direction of an optical axis. Furthermore, an imaging lens and a manufacturing method of a light-shielding element are also provided.

7 Claims, 6 Drawing Sheets

(56) References Cited

U.S. PATENT DOCUMENTS

2016/0092731 A1  3/2016  Dainty et al.
2017/0111557 A1  4/2017  Ko et al.
2018/0131853 A1  5/2018  Pellman et al.

* cited by examiner

IMAGING LENS AND MANUFACTURING METHOD OF LIGHT-SHIELDING ELEMENT

CROSS-REFERENCE TO RELATED APPLICATION

This application claims the priority benefit of Taiwan application serial no. 108132590, filed on Sep. 10, 2019. The entirety of the above-mentioned patent application is hereby incorporated by reference herein and made a part of this specification.

BACKGROUND OF THE INVENTION

1. Field of the Invention

The invention generally relates to a lens and a manufacturing method of a light-shielding element, in particular, an imaging lens and a manufacturing method of a light-shielding element applied to the imaging lens.

2. Description of Related Art

In a common imaging lens, after an ambient ray enters the imaging lens, the ray passes through a lens group and an aperture in the imaging lens, and is finally transmitted to an image sensor for imaging. As the needs of users are diversified, variable apertures have been widely used in electronic products in order to achieve different photographing effects.

In order to realize a variable aperture, one possible way is: a moving part is used in the imaging lens to adjust a size of the aperture. However, such a way will cause a very large volume of the imaging lens, and does not conform to a trend of miniaturization of electronic products.

SUMMARY OF THE INVENTION

In one embodiment of the invention, a design of realizing a variable aperture in an imaging lens without a moving part and a manufacturing method of a light-shielding element are provided.

An imaging lens of one embodiment of the invention includes an aperture and a dioptric lens piece.

In one embodiment, an aperture (or an aperture stop) includes a substrate and a light-shielding component, and is a two-piece formed aperture. A material of the substrate is a material that allows infrared light and visible light to substantially pass therethrough, and a material of the light-shielding component is a material that allows infrared light to substantially pass therethrough and substantially shields visible light. Moreover, the substrate and the light-shielding component each have a middle region and an outer edge region surrounding the middle region.

In another embodiment, the aperture is one piece formed, namely the aperture is not formed by connecting a plurality of elements. A material of the aperture may be: a mixed material formed by mixing the above materials of the substrate and the light-shielding component. The mixed material is also capable of allowing infrared light to substantially pass therethrough and substantially shielding visible light. In still another example, the aperture may be only made of the material of the light-shielding component without the above material of the substrate. The above aperture also has a design including a middle region and an outer edge region surrounding the middle region.

Since at least a part of the above aperture includes the material having the light-shielding capability, the aperture may be regarded as a light-shielding element. From another point of view, the imaging lens of the example takes a light-shielding element capable of allowing infrared light to substantially pass therethrough and substantially shielding visible light as the aperture (aperture stop).

An embodiment of the invention provides a manufacturing method of the above light-shielding element.

For a two-piece formed light-shielding element, a light-shielding layer may be firstly provided on a substrate by spraying or printing, so as to adhere the light-shielding layer to the substrate. Then, the substrate and the light-shielding layer are cut to form middle regions and outer edge regions. At this point, the two-piece formed light-shielding element has been manufactured.

For a one-piece formed light-shielding element, one way is to mix materials of a substrate and a light-shielding layer to form a material layer. Or, another way is to form a material layer only by a material of a light-shielding layer. Then, the above material layer is subjected to appearance treatment by cutting or printing, so as to form a one-piece formed hollow circular-ring-shaped light-shielding element. At this point, the one-piece formed light-shielding element has been manufactured.

It is worth mentioning that a thickness of the above aperture (the light-shielding element) in a direction of an optical axis falls within a range of 0.01 to 0.3 millimeters (mm), thereby avoiding the problem of an extremely large focal length offset of the imaging lens and allowing the imaging lens to have high image quality.

Based on the above, in the imaging lens of the embodiments of the invention, since the aperture (or light-shielding element) therein has different penetrating powers for image rays with different wavelength ranges, a light entering amount may be controlled without a moving part. The imaging lens may have different F-number under different wavelength ranges, and maintains a relatively small size. Furthermore, the thickness of the aperture in the direction of the optical axis is designed to be 0.01 mm to 0.3 mm, so that the imaging lens in the range may avoid the problem of the extremely large focal length offset, and thus has a high optical quality. In addition, the embodiment of the invention provides a manufacturing method of the light-shielding element, and the light-shielding element manufactured by the method may be applied to the above aperture. The manufacturing method is simple, easy and high in degree of freedom of design.

In order to make the aforementioned and other objectives and advantages of the present invention comprehensible, embodiments accompanied with figures are described in detail below.

DESCRIPTION OF THE EMBODIMENTS

Figure 1:
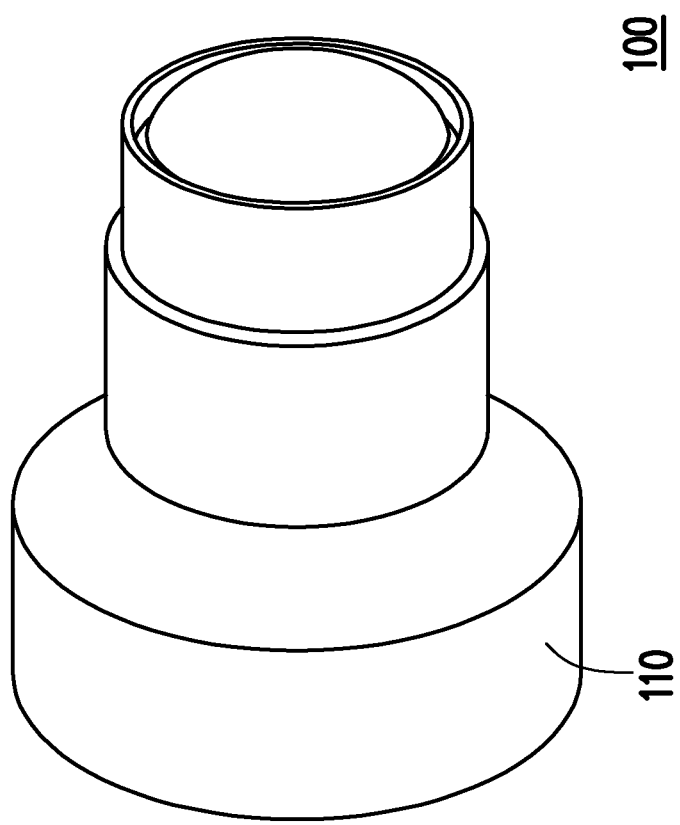
FIG. 1 is a schematic view of an appearance of an imaging lens according to one embodiment of the invention.
Figure 2:
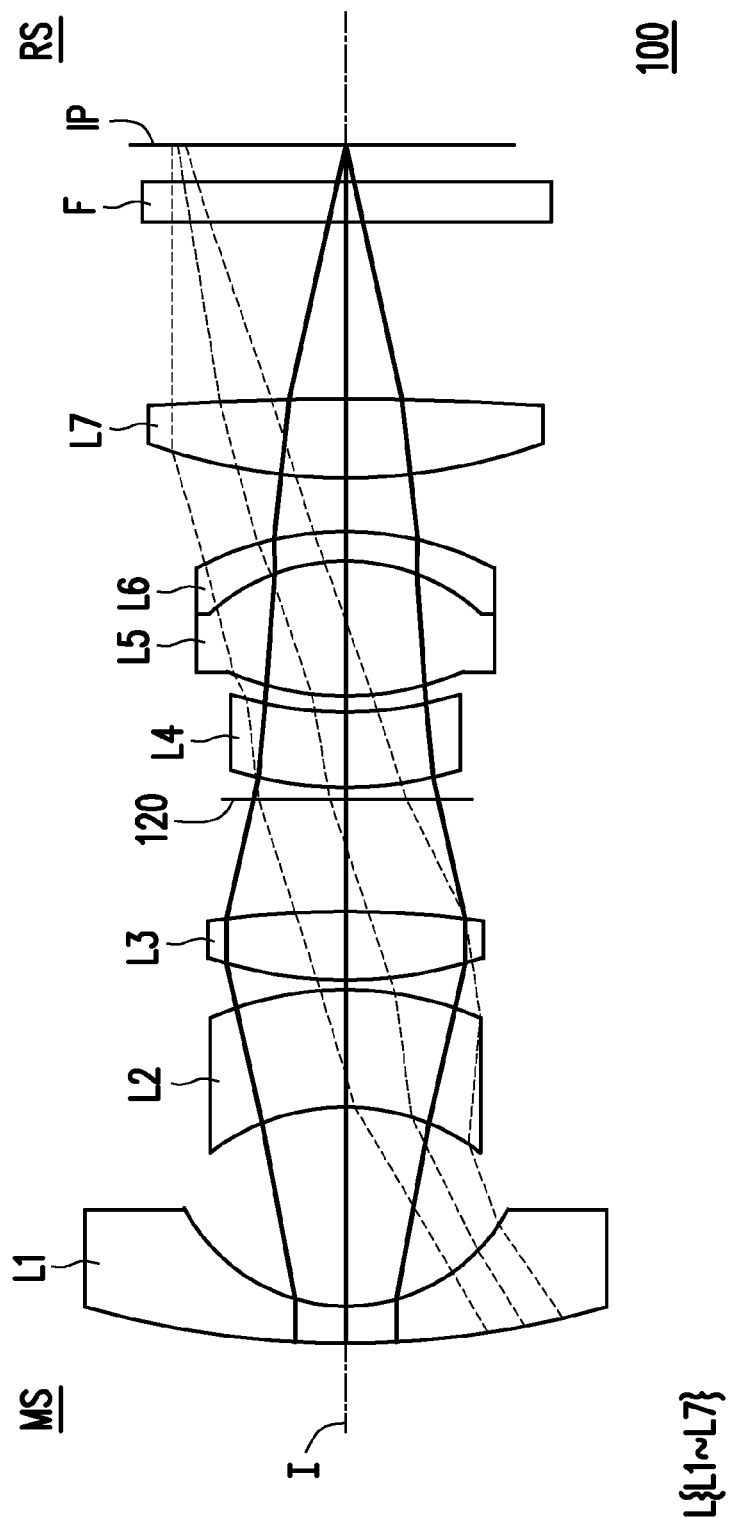
FIG. 2 is an internal schematic view of the imaging lens of FIG. 1.
Figure 3:
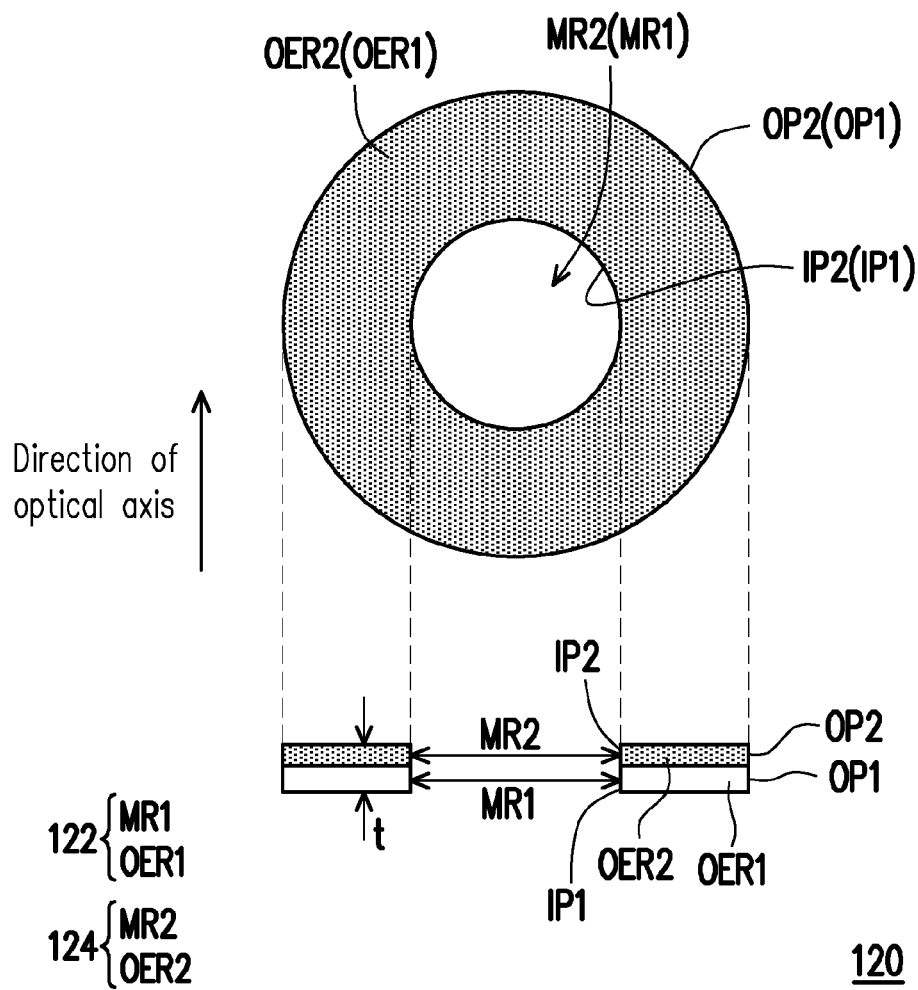
FIG. 3 illustrates a top view and a cross-sectional view of an aperture in FIGS. 1 and 2.
Figure 4A:
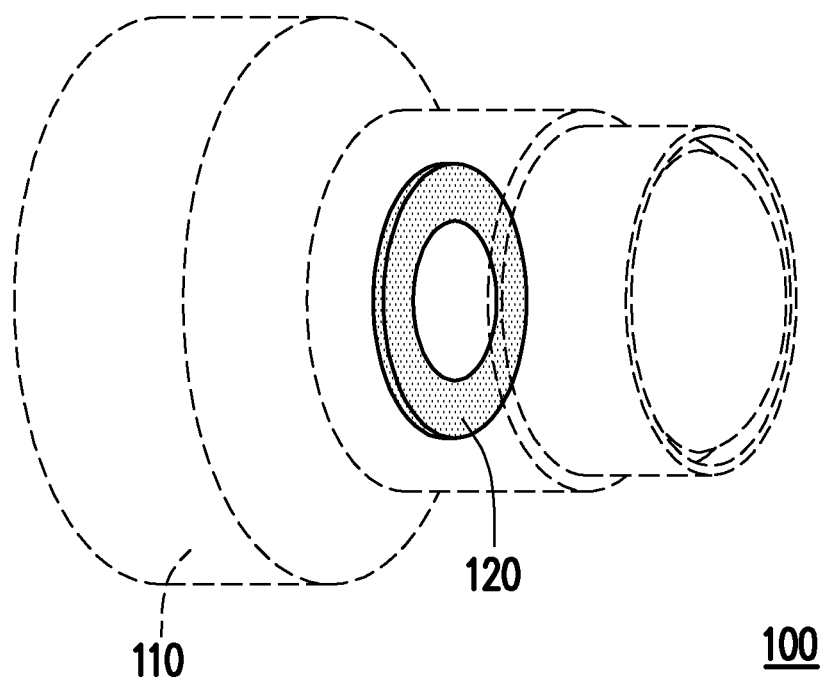
FIGS. 4A and 4B are equivalent optical schematic views of the aperture in the imaging lens under viewing angles of image rays with different wavelength ranges, respectively.
Figure 4B:
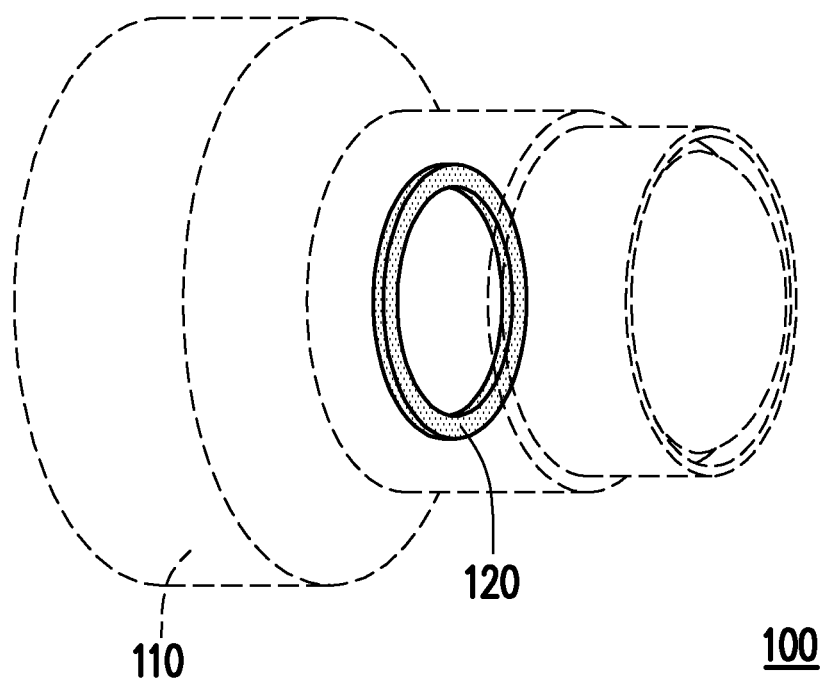

FIG. 1 is a schematic view of an appearance of an imaging lens according to one embodiment of the invention. FIG. 2 is an internal schematic view of the imaging lens of FIG. 1. FIG. 3 illustrates a top view and a cross-sectional view of an aperture in FIGS. 1 and 2. FIGS. 4A and 4B are equivalent optical schematic diagrams of the aperture in the imaging lens under viewing angles of image rays with different wavelength ranges, respectively. For conciseness, a barrel is omitted in FIG. 2, and each of FIG. 4A and FIG. 4B only illustrates an aperture and a barrel in the lens.

Referring to FIGS. 1 and 2, in the example, an imaging lens 100 has an optical axis I, which includes a barrel 110, lenses L1 to L7, and an aperture 120. The respective elements of the imaging lens 100 will be described in the following paragraphs, respectively.

In the example, the barrel 110 refers to an element for accommodating optical elements such as a lens piece (or a lens) and an aperture in the imaging lens 100.

In the example, the lens L refers to an optical element in which either one of a light entering surface and a light exiting surface is not planar, or at least one of the light entering surface and the light exiting surface has light refracting capability (or a refractive power). In the example, there are 7 lenses L in the imaging lens 100. In other examples, there are N lens with refractive powers in the imaging lens 100, and when N is more than 3 and less than 7, 10 and 15, optimal, preferable and good cost performances are achieved, but the number of lenses in the imaging lens 100 is not limited thereto. The number of aspherical lenses in the imaging lens 100 may be selectively 0 or N, or a positive integer more than 0.2N, 0.4N, 0.6N, and 0.8N.

In the example, the aperture 120 (or aperture stop) refers to an element that limits a beam in the lens to control an aperture size of the lens or a light flux. The aperture 120 mentioned in various embodiments of the invention may be disposed between two lenses, but the invention is not limited thereto. If necessary, the aperture 120 may be disposed at an optical upstream of a first lens with refractive power in a light entering direction, and may also be disposed at an optical downstream of a last lens with refractive power in a light exiting direction, namely a position between a last lens and a photosensitive element.

Referring to FIG. 3, in the example, the aperture 120 is two-piece formed and prepared by combining two materials, including a substrate 122 and a light-shielding layer 124. The substrate 122 includes a middle region MR1 (or a first middle region) and an outer edge region OER1 (or a first outer edge region) surrounding the middle region MR1. The outer edge region OER1 allows visible light and infrared light to pass therethrough substantially. The light-shielding layer 124 is disposed on the substrate 122, and includes a middle region MR2 (or a second middle region) and an outer edge region OER2 (or a second outer edge region) surrounding the middle region MR2. The outer edge region OER2 allows infrared light to substantially pass therethrough and substantially shields visible light. The middle regions MR1, MR2 are both through holes and do not include any solid material. Furthermore, an outer contour OP1 and an inner contour IP1 of the outer edge region ORE1 of the substrate 122 are substantially aligned with an outer contour OP2 and an inner contour IP2 of the outer edge region ORE2 of the light-shielding layer 124. In other words, the aperture 120 may be regarded as a hollow circular-ring-shaped light-shielding element.

Based on the above, visible light has a wavelength range, for example, between 400 nm and 800 (excluded) nm, and infrared light has a wavelength range, for example, more than 800 nm to 940 nm. In addition, in the absence of other instructions, allowing a certain ray to substantially pass therethrough and substantially shielding a certain ray mean that for the certain ray, a transmittance is equal to or more than 70% and less than or equal to 30%. In addition, the infrared light may be understood as a ray with a wavelength of 800 to 940 nm, while the visible light may be understood as a ray with a wavelength of 400 to 800 (excluded) nm.

That is, if it is said that a certain region of a certain element is allowed to substantially shield the visible light, it may mean that the certain region of the certain element has a transmittance of less than 30% to a beam with at least one wavelength value (for example, 530 nm) within 400 to 800 (excluded) nm. If it is said that a certain region of a certain element may allow the infrared light to substantially pass therethrough, it may mean that the certain region of the certain element has a transmittance of more than 70% to a beam with at least one wavelength value (for example, 800 nm) within 800 to 940 nm.

In addition, in the embodiment of the invention, a material (or a first material) of the substrate 122 has a transmittance of more than 70% to both a beam with a wavelength of 800 nm and a visible beam with a wavelength of 530 nm when the thickness of substrate 122 is 0.3 mm. However, by material adjustment, the material (or the first material) of the substrate 122 may selectively have a transmittance of more than 80%, 85% and 90%, respectively, to both the beam with the wavelength of 800 nm and the beam with the wavelength of 530 nm when measured with the thickness of 0.3 mm.

The material of the substrate 122 is not glass or other brittle materials, and the substrate 122 may be substantially composed of a substrate material such as polyphenylene sulfide (PPS), polycarbonate (PC), poly(methyl methacrylate) (PMMA), or polyethylene terephthalate (PET) and a transparent resin material, or any one or a mixture of other plastic substrate materials. In the example, the substrate 122 is the transparent resin material. A material (or a second material) of the light-shielding layer 124 may be a material which has a transmittance of more than 70% to a beam having a wavelength of 800 nm and a transmittance of less than 30% to a beam with a wavelength of 530 nm when a thickness of the light-shielding layer 124 is 0.3 mm. A material satisfying the above conditions is, for example, ink special for transmitting IR (infrared light), which is available in the market. For example, the material of the light-shielding layer 124 is, for example, IR-725/P black ink sold by Tsaui Mining Industrial Co., Ltd., and 50513 type, 41204 type or 6212 type black ink sold by Justar Technology Co., Ltd. In the example, the materials of the substrate 122 and the light-shielding layer 124 are respectively the transparent resin material and the IR-725/P black ink sold by Tsaui Mining Industrial Co., Ltd., which is an example thereof. However, due to the material adjustment, the light-shielding layer 124 selectively has a transmittance of more than 70%, 80%, 85% and 90% to a beam with a wavelength of 800 nm when a thickness of light-shielding layer 124 is 0.3 mm. Meanwhile, the light-shielding layer 124 has a transmittance of less than 30%, 20% and 10% to a beam with a wavelength of 530 nm measured with the thickness of 0.3 mm.

The following paragraphs will explain in detail the arrangement relationships between the above elements and the optical effect of the imaging lens 100 in conjunction with the above drawings.

Referring to FIG. 2, the lenses L1 to L3, the aperture 120 and the lenses L4 to L7 are sequentially set in the imaging lens 100 along the optical axis I from a zoom-in side MS to a zoom-out side RS. The lenses L1 to L7 and the aperture 120 are disposed in the barrel 110. After an image ray emitted by a to-be-shot object (not shown) enters the optical imaging lens 100, the ray sequentially passes through the lenses L1 to L3, the aperture 120, the lenses L4 to L7, and a glass cover F, and forms an image on an image plane IP. A chief ray and a marginal ray in the image ray are respectively represented by a solid thick black line and a dotted line. A sensing plane such as an image sensor (not shown) may be disposed on the image plane IP. It should be noted that the number, shape, spacing or thickness of each lens piece as shown in FIG. 2 is illustrative, and the invention is not limited thereto.

Referring to FIGS. 2, 3 and 4A, since a middle portion of the substrate 122 is a through hole without any material in the aperture 120, a ray may pass therethrough freely. The outer edge region OER1 surrounding the middle portion allows visible light and infrared light to pass therethrough substantially, and the outer edge region OER2 of the light-shielding layer 124 allows infrared light to substantially pass therethrough and substantially shields visible light. When the wavelength of the image ray falls within a wavelength range of the visible light, the image ray may be substantially shielded by the outer edge region OER2 of the light-shielding layer 124. Therefore, for the visible light, the aperture 120 has a large light-shielding area and high light-shielding capability relative to the infrared light, and less visible light may pass through the aperture 120. From another point of view, as shown in FIG. 4A, the aperture 120 forms a relatively small equivalent optical aperture size for the visible light.

Referring to FIGS. 2, 3 and 4B, when the wavelength of the image ray falls within a wavelength range of infrared light, the image ray may sequentially pass through the outer edge region OER1 of the substrate 122 and the outer edge region OER2 of the light-shielding layer 124. For the infrared light, the aperture 120 has a small light-shielding area and low substantial light-shielding capability relative to the visible light, and more infrared light may pass through the aperture 120. From another point of view, as shown in FIG. 4B, the aperture 120 forms a relatively large equivalent optical aperture size for the infrared light.

In the aperture 120 of the imaging lens 100 of the example, since the outer edge region OER2 of the light-shielding layer 124 allows infrared light to substantially pass therethrough and substantially shields visible light, different penetrating powers are possible in the wavelength ranges of the visible light and the infrared light. Thereby, the aperture 120 may control an amount of light entering a lens group at the downstream of an optical path of the aperture 120 in different wavelength ranges, and the imaging lens 100 has different F-number. Therefore, the imaging lens 100 realizes a variable aperture without a moving part, is relatively small in volume, and conforms to a trend of miniaturization.

A manufacturing method of the aperture 120 will be described in detail in the following paragraphs, and includes the following steps A to D.

Step A: the substrate 122 is provided.

Step B: the material of the light-shielding layer 124 is prepared. The materials of the light-shielding layer 124 and the substrate 122 have been mentioned in the above paragraphs, and descriptions thereof are omitted herein.

Step C: the light-shielding layer 124 is formed on the substrate in a manner of spraying, coating, printing, deposition and the like, and then is solidified.

Step D: finally, unnecessary portions of the substrate 122 and the light-shielding layer 124 are removed in a cutting manner, so as to sequentially form middle regions of the substrate 122 and the light-shielding layer 124 and outer edge regions of the substrate 122 and the light-shielding layer 124, wherein the cutting manner may be, for example, implemented by a tool such as scissors and a cutter, a high-pressure water column (water cutter) or high-energy radiation (such as laser), but the manner is not limited thereto. At this point, the aperture 120 (light-shielding element) has been approximately manufactured.

It may be seen from the above that the manufacturing method of the aperture 120 (light-shielding element) of the example is simple, and may design different shapes by the simple cutting manner, and is high in degree of freedom of design.

It must be noted here that the following embodiment uses partial contents of the above embodiment, and descriptions of same technical contents are omitted. The same element names may refer to partial contents of the above embodiment, so the descriptions thereof are omitted in the following embodiment.

Figure 5:
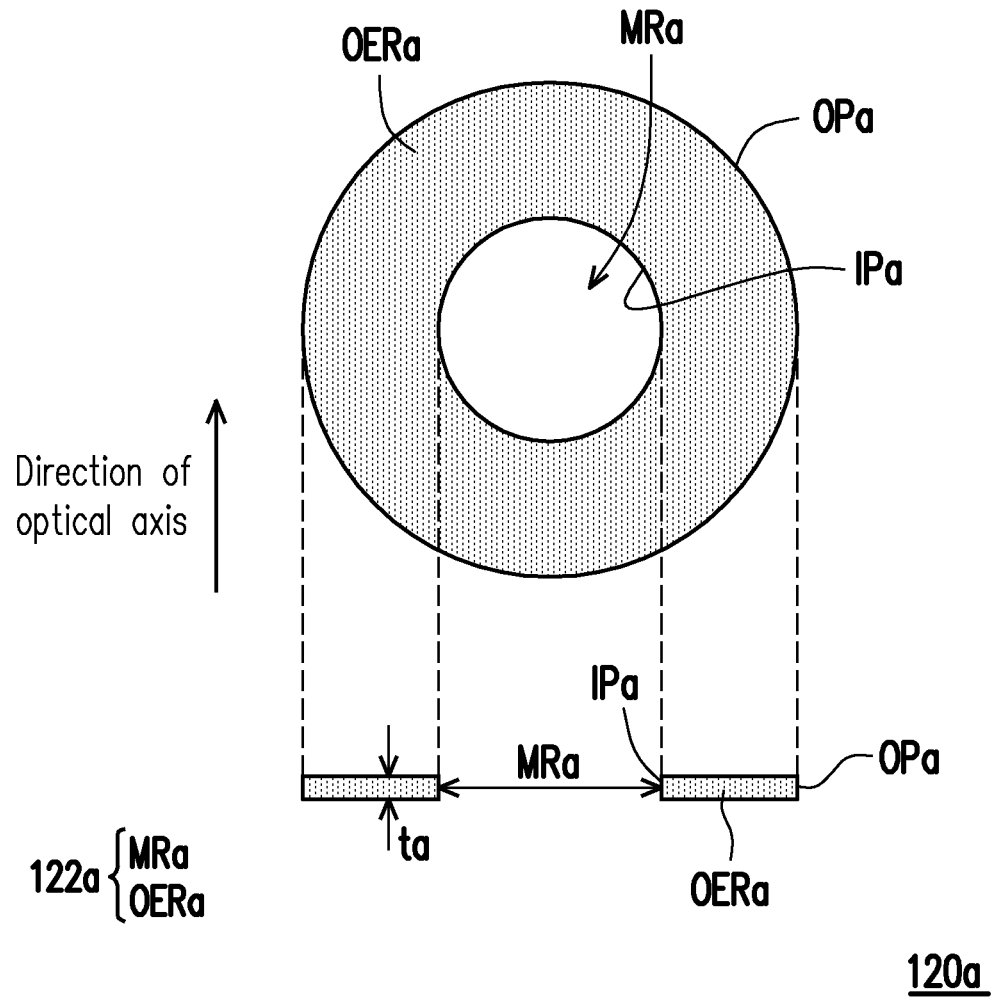
FIG. 5 illustrates a top view and a cross-sectional view of an aperture according to another embodiment of the invention.

FIG. 5 illustrates a top view and a cross-sectional view of an aperture according to another embodiment of the invention.

An aperture 120a of FIG. 5 is substantially the same as the aperture 120 of FIG. 3, and a main difference is that: the aperture 120 of FIG. 3 is two-piece formed (including the substrate 122 and the light-shielding layer 124) and the aperture 120a of FIG. 5 is one piece formed (including a substrate 122a). In detail, the substrate 122a includes a middle region MRa and an outer edge region OERa surrounding the middle region MRa. In the example, a material of the outer edge region OERa, for example, includes the materials of the above substrate 122 and the light-shielding layer 124 of the aperture 120. In other words, the material of the outer edge region OERa may be selectively formed by mixing the materials of the substrate 122 and the light-shielding layer 124 as previously described.

It is worth mentioning that in other examples, the above one piece formed aperture may also be formed only by the material of the light-shielding layer 124. In other words, the aperture may not include the material of the substrate 122.

The manufacturing method of the aperture 120a (light-shielding element) will be described in detail in the following paragraphs, and includes the following steps E to F.

Step E: a first material is prepared, which has a transmittance of more than 70% to a beam with a wavelength of 800 nm and has a transmittance of more than 70% to a beam with a wavelength of 530 nm when a thickness is 0.3 mm, wherein the material thereof may refer to the material of the substrate 120 mentioned in the above paragraphs.

Step F: a second material is prepared, which has a transmittance of more than 70% to the beam with the wavelength of 800 nm and has a transmittance of less than 30% to the beam with the wavelength of 530 nm measured with the thickness of 0.3 mm, wherein the material thereof may refer to the material of the light-shielding layer 124 mentioned in the above paragraphs.

Step G: the first and second materials are mixed to prepare a third material.

Step F: after the third material is made into a material layer having a thickness between 0.01 mm and 0.3 mm, a hollow circular-ring-shaped one piece formed light-shielding element may be formed by the above various modes such as cutting and printing.

Another mode is that: the light-shielding element may be formed by printing the third material, and a printing process, for example, includes the following steps F-1 to F-3.

Step F-1: two circular ring parts with different radiuses are prepared.

Step F-2: the third material is cut by a circular ring part with a relatively large radius in the two circular ring parts to form an outer contour OPa of the outer edge region OERa.

Step F-3: the third material is cut by a circular ring part with a relatively small radius in the two circular ring parts to form an inner contour IPa of the outer edge region OERa. At this point, the aperture 120a has been approximately manufactured.

It should be noted that the above steps F-2 and F-3 may be exchanged or performed simultaneously, and the invention is not limited thereto. Meanwhile, the circular ring part described above is merely illustrative, and laser cutting or other known cutting modes may be performed if necessary, and the invention is not limited thereto.

In addition, if an aperture that does not contain the material (the first material) of the substrate is to be manufactured, the above steps E and G may be omitted, and after the second material is directly made into the material layer having the thickness between 0.01 mm and 0.3 mm, the hollow circular-ring-shaped one piece formed light-shielding element is formed by the above cutting or printing mode, and descriptions thereof are omitted herein.

Figure 6A:
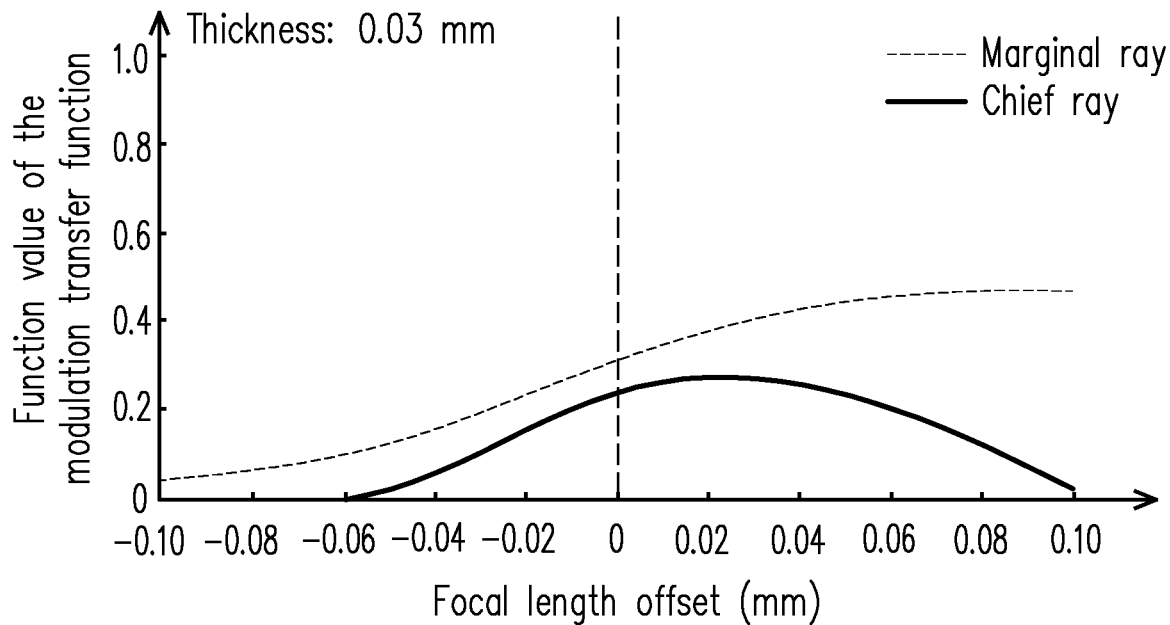
FIGS. 6A and 6B are optical simulation graphs of an imaging lens using apertures having different thicknesses.
Figure 6B:
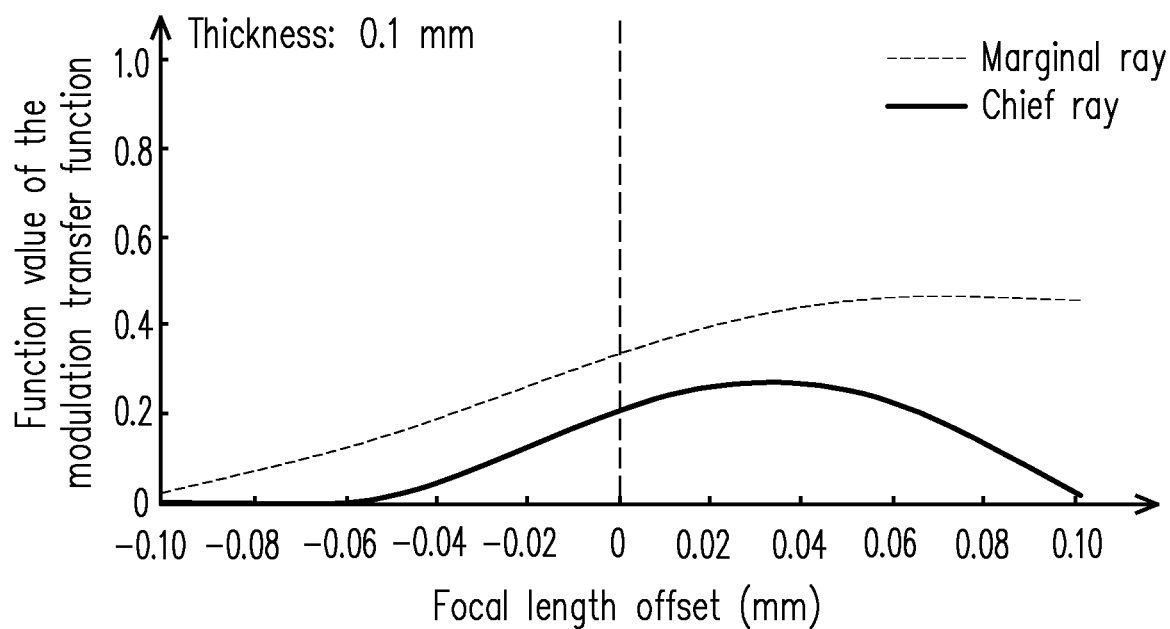

FIGS. 6A and 6B are optical simulation diagrams of an imaging lens using apertures having different thicknesses.

It is worth mentioning that in the apertures 120 and 120a of the embodiments of the invention, the thickness in the direction of the optical axis I is designed to be in a range of 0.01 mm to 0.3 mm. With the aperture in this thickness range, the imaging lens does not have an extremely large focal length offset, and thus has a high optical quality and an enough mechanical strength. FIGS. 6A and 6B are optical simulation diagrams of an imaging lens using apertures having thicknesses of 0.03 mm and 0.1 mm in the direction of the optical axis I. A transverse axis represents the focal length offset (unit: millimeter (mm)), and a longitudinal axis represents a function value of a modulation transfer function (MTF); a solid line represents a function curve of a chief ray, and a dotted line represents a function curve of a marginal ray. It may be seen from FIG. 6A that the focal length offset corresponding to a peak of the chief ray on the longitudinal axis is about 0.02 mm, and it may be seen from FIG. 6B that the focal length offset corresponding to the peak (the optical resolution) of the chief ray on the longitudinal axis is about 0.035 mm. That is, the focal length offset is relatively small under the thickness design of 0.03 mm in FIG. 6A. Generally, the smaller the focal length offset of the imaging lens, the better, which may show that under the above thickness design, the imaging lens will not have an extremely large focal length offset, and thus has a relatively high optical quality. Referring to FIGS. 3 and 5 again, in the above embodiment, the thicknesses t, to of the apertures 120, 120a are 0.22 mm.

It should be noted that in the above embodiment of the invention, a frame (not shown) may be used to frame the aperture 120 or 120a selectively, but not necessarily, by being disposed at an outer rim of the aperture, and the aperture is connected with the barrel through the frame. However, in the example, the apertures 120 and 120a are directly fixed inside the barrel without the frame.

Based on the above, in the imaging lens of the embodiments of the invention, the outer edge region of the light-shielding layer (or light-shielding element) of the aperture may allow the infrared light to substantially pass therethrough and substantially shield the visible light. Therefore, when the image ray is the infrared light, the aperture may allow more infrared light to pass therethrough, that is, the aperture forms a relatively large equivalent optical aperture size for the infrared light; and when the image ray is the visible light, the aperture may shield part of the visible light to enter the downstream of an optical path thereof, that is, the aperture forms a relatively small equivalent optical aperture size for the visible light. The imaging lens may have different aperture performances under different wavelength ranges without a moving part, is relatively small in volume, and conforms to a trend of miniaturization. In addition, the embodiment of the invention provides a manufacturing method of the light-shielding element, and the light-shielding element manufactured by the method may be applied to the above aperture (or light-shielding element). The manufacturing method is simple, easy and high in degree of freedom of design.

Although the present invention is described with reference to the above embodiments, the embodiments are not intended to limit the present invention. A person of ordinary skill in the art may make variations and modifications without departing from the spirit and scope of the present invention. Therefore, the protection scope of the present invention should be subject to the appended claims.

What is claimed is:

1. An imaging lens, comprising:
   the following that are sequentially arranged from a zoom-in side to a zoom-out side:
      an aperture, comprising:
         a substrate, comprising a first outer edge region and a first middle region, wherein the first outer edge region surrounds the first middle region, and the first outer edge region allows visible light and infrared light to substantially pass therethrough; and
         a light-shielding layer, disposed on the substrate and comprising a second outer edge region and a second middle region, wherein the second outer edge region surrounds the second middle region, and the second outer edge region allows infrared light to substantially pass therethrough and substantially shields visible light; and
      a lens with refractive power;
      wherein a thickness of the aperture is between 0.01 mm and 0.3 mm along a direction of an optical axis.

2. The imaging lens according to claim 1, wherein the substrate has a transmittance of more than 70% to both rays with a wavelength of 800 nm and a wavelength of 530 nm, and the light-shielding layer has a transmittance of more than 70% to a ray with a wavelength of 800 nm and a transmittance of less than 30% to a ray with a wavelength of 530 nm.

3. The imaging lens according to claim 1, wherein an outer contour and an inner contour of the first outer edge region of the substrate are substantially aligned with an outer contour and an inner contour of the second outer edge region of the light-shielding layer.

4. The imaging lens according to claim 1, wherein the first middle region and the second middle region are both through holes and do not comprise any solid material.

5. The imaging lens according to claim 1, wherein the imaging lens has different F-number under an infrared light band and a visible light band.

6. The imaging lens according to claim 1, wherein the light-shielding element has a transmittance of more than 70% to a ray with a wavelength of 800 nm and a transmittance of less than 30% to a ray with a wavelength of 530 nm.

7. The imaging lens according to claim 1, wherein the aperture or the light-shielding element is shaped as a hollow circular ring.

* * * * *